United States Patent [19]
Ichimura et al.

[11] Patent Number: 5,183,592
[45] Date of Patent: Feb. 2, 1993

[54] ELECTROCONDUCTIVE ADHESIVE COMPRISING AN EPOXY NOVOLAK RESIN AND PHENOL-ARALKYL RESIN

[75] Inventors: Nobuo Ichimura, Takahagi; Yauso Miyamoto; Mitsuo Yamazaki, both of Hitachi, all of Japan

[73] Assignee: Hitachi Chemical Company Ltd., Tokyo, Japan

[21] Appl. No.: 639,020

[22] Filed: Jan. 9, 1991

[30] Foreign Application Priority Data

Jan. 19, 1990 [JP] Japan .................................. 2-011635

[51] Int. Cl.$^5$ ................................................. H01B 1/22
[52] U.S. Cl. ........................................ 252/512; 252/513; 252/514; 523/457; 523/458; 523/459; 524/439; 524/440; 156/330
[58] Field of Search ................ 252/512, 514, 513, 519; 523/457–459; 524/439, 440; 156/330

[56] References Cited

U.S. PATENT DOCUMENTS

| | | | |
|---|---|---|---|
| 3,909,480 | 9/1975 | Ogata et al. | 523/457 |
| 4,652,398 | 3/1987 | Goswami et al. | 252/513 |
| 4,696,764 | 9/1987 | Yamazaki | 524/439 |
| 4,780,371 | 10/1988 | Joseph et al. | 252/513 |
| 4,803,543 | 2/1989 | Inayoshi et al. | 156/330 |
| 4,880,570 | 11/1989 | Sanborn et al. | 252/512 |
| 5,043,102 | 8/1991 | Chen et al. | 252/514 |

*Primary Examiner*—Paul Lieberman
*Assistant Examiner*—Bradley A. Swope
*Attorney, Agent, or Firm*—Antonelli, Terry, Stout & Kraus

[57] ABSTRACT

An electroconductive adhesive comprising an epoxy-novolak resin, a phenol-aralkyl resin, a glycidyl group-containing silane coupling agent, an organic borate and an electro-conductive metal power is excellent in reliability in moisture and hydrolytic resistance and useful for semiconductor devices.

5 Claims, 1 Drawing Sheet

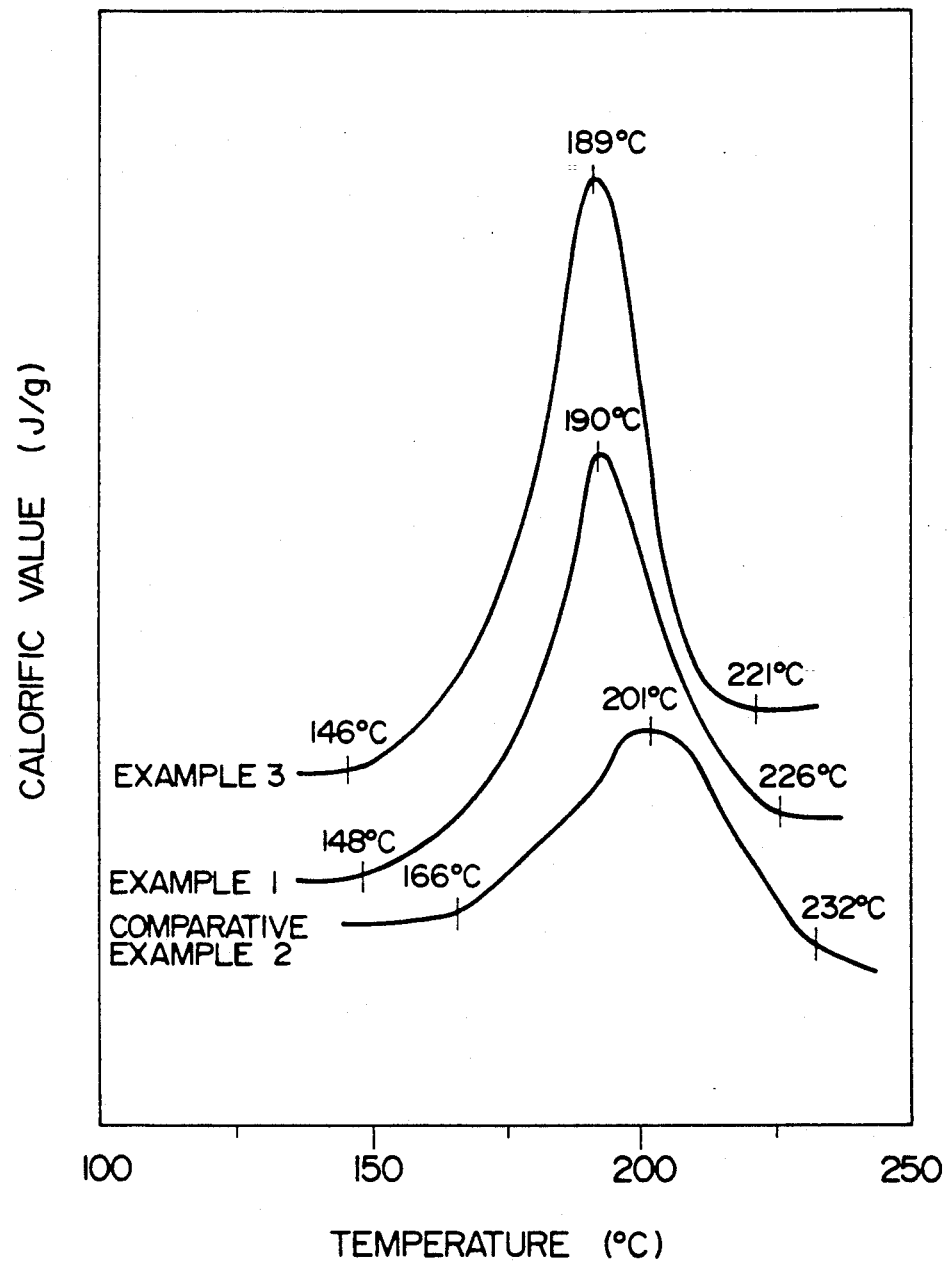

ELECTROCONDUCTIVE ADHESIVE COMPRISING AN EPOXY NOVOLAK RESIN AND PHENOL-ARALKYL RESIN

BACKGROUND OF THE INVENTION

This invention relates to an electro conductive adhesive, more particularly to an electroconductive adhesive which is fast-setting and has excellent reliability in moisture and hydrolytic resistance, and semiconductor devices using such an adhesive.

In the fabrication of resin-sealed type semiconductor devices, solder or epoxy-based conductive pastes have been used for cost reduction in the step of bonding IC's or LSI's to a lead frame. However, with a recent tendency toward enlargement of LSI's, request is rising for an electroconductive paste having higher performance.

For the electroconductive adhesives, as for instance related in Japanese Patent Examined Publication No. 63-4701, there are usually used expoxy resins blended with silver (Ag) powder, and phenolic novolak resins are used as curing agent of said epoxy resins (bisphenol A type or novolak type) while imidazoles are used as curing accelerator. These electroconductive adhesives have high reliability regarding moisture-proofness and are also excellent in hydrolytic resistance. However, for curing of said adhesives, 1- to 2-hour treatment in an oven with internal circulation of hot air of 150°-180° C. is required. In order to attain cost reduction by improvement of productivity, offer of a fast-setting type conductive adhesive is required.

SUMMARY OF THE INVENTION

An object of the present invention is to eliminate these problems in the prior art and provide an electroconductive adhesive which is capable of fast setting while maintaining high reliability of moisture-proofness and excellent hydrolytic resistance, and the semiconductor devices using such adhesive.

Thus, according to the present invention, there is provided an electroconductive adhesive compirising (a) an epoxy-novolak resin, (b) a phenol-aralkyl resin and-/or a phenolic novolak resin, (c) a glycidyl group-containing silane-based coupling agent blended in an amount of 30-500% by weight based on said epoxy-novolak resin (a), (d) an organic borate, and (e) an electroconductive metal powder. It is also envisaged in this invention to provide the semiconductor devices in which the semiconductor elements are bonded to a lead frame with said electroconductive adhesive.

BRIEF DESCRIPTION OF THE DRAWING

The accompanying drawing is a graph showing the curves of curing exotherm of the adhesives obtained in Examples 1 and 3 and Comparative Example 2.

DESCRIPTION OF THE PREFERRED EMBODIMENTS

As the epoxy-novolak resin (a) used in the production of the electroconductive adhesive of this invention, there can be employed commercial products of said type of resin such as, for example, DEN-431, DEN-438 and Quartrex 2010 available from Dow Chemical Co., EPN-1138, EPN-1139, ECN-1273, ECN-1280 and ECN-1299 available from Ciba Geigy Corp. and Epikote 152 and Epikote 154 available from Shell Chemical Co. This epoxy-novolak resin is preferably used in the form of a solution prepared by dissolving said resin in an aromatic solvent such as xylene and toluene or a silane coupling agent mentioned later. Epoxy equivalent of said resin is preferably 100 to 300, more preferably 160 to 220.

The phenol-aralkyl resin (b) used in this invention is a resin obtained by polycondensing α,α'-dimethoxy-p-xylene and a phenolic monomer with a Friedel-Crafts catalyst. This resin is used as a curing agent for said epoxy-novolak resin. This type of resin is also commercially available under the trade names of, for example, XL-225 by Mitsui-Toatsu Chemicals Inc. and XYLOK-225 by Albright & Wilson Ltd.

The phenolic novolak resin used in this invention is a condensate obtained by reacting a phenol and an aldehyde in the presence of an acid catalyst. Preferably the condensate contains as little unreacted phenol as possible. A typical example of such phenolic novolak resin is a low-molecular novolak resin obtained by reacting carbolic acid and formaldehyde in a dilute aqueous solution under a weakly acidic condition.

It is possible to use either one or both of said phenol-aralkyl resin and phenolic novolak resin, but the total amount of such resins used is preferably such that the number of phenolic OH groups per one epoxy group in the epoxy-novolak resin will be in the range of 0.6 to 1.5, especially 0.8 to 1.2 in view of the properties of the cured product.

The glycidyl group-containing silane-based coupling agent (c) used in the present invention can be selected from many commercial products of this type of coupling agents, which include KBM-403 produced by Shin-Etsu Chemical Co., Ltd., γ-glycidoxypropylmethyldimethoxysilane (TSL-8355) produced by Toshiba Silicone Co., Ltd.), γ-glycidoxypropyl-pentamethoxydisiloxane (TSL-9905 produced by Toshiba Silicone Co., Ltd.), γ-glycidoxypropyldimethylethoxysilane (produced by Chisso Corp.), γ-glycidoxypropyldimethylethoxysilane (produced by Chisso Corp.), and (γ-glycidoxypropyl)-bis(trimethylsiloxy)methylsilane (produced by Chisso Corp.).

The amount of said coupling agent used in this invention is defined to be within the range of 30 to 500% by weight based on the epoxy-novolak resin. If the amount of the coupling agent used is less than 30% by weight (based on said epoxy-novolak resin), the resulting solution becomes too high in viscosity and is also deteriorated in compatibility with the phenol-aralkyl resin. On the other hand, if the amount of said coupling agent exceeds 500% by weight, the cured product is deteriorated in adherence and heat resistance.

As examples of the organic borates (d) usable in this invention, there can be named, for example, tetraphenylphosphoniumtetraphenyl borate (produced by Hokko Kagaku Co., Ltd.), 2-ethyl-4-methylimidazoletetraphenyl borate (Hokko Kagaku), tetraphenyl borate of 1,8-diazabicyclo(5,4,0)undecene-7 (U-CAT 5002 produced by SAN-APRO CO., Ltd.) and the like. These organic borates may be used either singly or in combination. The amount of the organic borate(s) used in this invention is preferably defined within the range of 0.5 to 30% by weight, more preferably 1 to 20% by weight based on said phenol-aralkyl resin and-/or phonolic novolak resin, in view of the curing characteristics and viscosity stability of the produced adhesive.

As the electroconductive metal powder (e), there can be used electroconductive powders of silver, gold, copper, nickel, iron, stainless steel, etc., which can give electroconductivity to the electroconductive adhesive. These electroconductive metal powders are available commercially, for example, a gold powder under a trade name of TA-1 mfd. by Tokuriki Kagaku Co., Ltd., a copper powder under a trade name of CE-115 mfd. by Fukuda Kinzoku Hakufun Co., Ltd., a nickel powder under a trade name of Type-123 mfd. by INCO Ltd., an iron powder under a trade name of Fe-S-100 mfd. by Fukuda Kinzoku Hakufun Co., Ltd., a stainless steel powder under a trade name of SUS 304L mfd. by Fukuda Kinzoku Hakufun Co., Ltd., etc. Among these electroconductive powders, silver powder is more preferable from the viewpoint of resistance to oxidation and electroconductivity.

The silver powder used in this invention is preferably flaky powder of silver, which is commercially available under the trade names of, for example, TCG-1, TCG-7-6, E-20 and TCG-11N from Tokuriki Kagaku Co., Ltd., and Agc-A from Fukuda Kinzoku Hakufun Co., Ltd. Preferably said powder has an average particle size of about 1 to 3 $\mu$m. If necessary, flaky powder and spherical powder may be used in admixture. As the spherical powder, there can be used, for instance, those commercially available under the trade names of H-1 from Tokuriki Kagaku Co., Ltd. and Agc-G from Fukuda Kinzoku Hakufun Co., Ltd.

The ratio of said electroconductive metal powder in the solid constituents ((a), (b), (d) and (e)) is preferably in the range of 65 to 85% by weight, more preferably 70 to 80% by weight, from the viewpoint of conductivity and viscosity of the produced adhesive.

The adhesive of this invention can be obtained by mixing the above-described materials. It is to be noted that use of an epoxy-novolak resin and phenol-aralkyl resin contributes to the improvement of curing characteristics of the composition while use of an organic borate further improves the curing characteristics and enables quick curing of the adhesive composition. Further, use of said silane coupling agent is helpful for producing an adhesive which is fast-setting and yet maintains high adherence.

The adhesive of this invention may contain where necessary a solvent such as 2-butoxyethanol, 2-butoxyethyl acetate and the like.

The semiconductor elements such as IC's and LSI's are bonded to a lead frame by using the conductive adhesive of this invention and then the assembly is resin-sealed by a conventional method, giving a semiconductor device having high reliability of moistureproofness and excellent productivity.

The present invention will be described more particularly below by showing the examples thereof. In the following descriptions of the Examples, all "parts" are by weight unless otherwise noted.

EXAMPLE 1

4.8 parts of DEN-438 (an epoxy-novolak resin) was added to 2.0 parts of KBM-403 (a glycidyl group-containing silane coupling agent) and the mixture was dissolved by heating at 100° C. for 30 minutes.

Separately from the above operation, 6.5 parts of XL-225 (a phenol-aralkyl resin) was added to 14.0 parts of 2-butoxyethanol and dissolved by heating at 100° C. for 30 minutes to form an XL-225 solution.

The thus prepared two solutions were joined and mixed at room temperature, and in this mixed solution were added and mixed 0.2 part of tetraphenylphosphoniumtetraphenyl borate and 40.0 parts of TCG-1 (silver powder) to obtain a conductive adhesive.

EXAMPLE 2

4.8 parts of Quatrex 2010 (an epoxy-novolak resin) and 2.0 parts of KBM-403 were mixed and dissolved by heating at 100° C. for 30 minutes to form a solution. In this solution was added and mixed 20.5 parts of the XL-225 solution used in Example 1, and then tetraphenylphosphoniumtetraphenyl borate and silver powder were further added and mixed similarly to Example 1 to obtain a conductive adhesive.

EXAMPLE 3

4.8 parts of Qautrex 2010 and 2.0 parts of KBM-403 were mixed and dissolved by heating at 100° C. for 30 minutes. Separately, 3.8 parts of HP-607N (a phenolic novolak resin produced by Hitachi Chemical Company, Ltd.) was added to 10 parts of 2-butoxyethanol and dissolved by heating at 100° C. for 30 minutes to form an HP-607N solution. The thus prepared two solutions were mixed at room temperature and the mixed solution was further added and mixed with 0.04 part of U-CAT 5002 and 32.0 parts of TCG-1 (silver powder) to obtain a conductive adhesive.

EXAMPLE 4

6.8 parts of the Quatrex 2010 solution containing KBM-403 obtained in Example 2, 10.2 parts of the XL-225 solution obtained in Example 1, 6.9 parts of the HP-607N solution obtained in Example 3, 0.1 part of 2-ethyl-4-methylimidazoletetraphenyl borate, and 30.0 parts of Agc-A and 5.7 parts of Agc-G (silver powder) were mixed to obtain a conductive adhesive.

COMPARATIVE EXAMPLE 1

A commercial conductive adhesive using a bisphenol A type epoxy resin, a phenolic novolak resin as curing agent and an imidazole as curing accelerator was prepared.

COMPARATIVE EXAMPLE 2

A conductive adhesive was obtained by following the same procedure as Example 1 except for use of triphenylphosphine in place of tetraphenylphosphoniumtetraphenyl borate.

TEST EXAMPLES

Si chips were bonded to a lead frame by using the conductive adhesives of Examples 1–4 and Comparative Examples 1–2 under the bonding conditions shown in Table 1. The adhesive strength and hydrolytic Cl$^-$ concentration were determined for each adhesive. The results are shown in Table 1.

Also, the calorific values (J/g) of curing exotherm generated when heating 3 mg of the adhesives of Examples 1 and 3 and Comparative Example 2 at a rate of 10° C./min were determined by a differential thermobalance. The results are shown in FIG. 1.

TABLE 1

|  | Example 1 | Example 2 | Example 3 | Example 4 | Comp. Example 1 | Comp. Example 2 | Remarks |
|---|---|---|---|---|---|---|---|
| Adhesive strength (kg)*1 | | | | | | | |
| Cured at 250° C. for 20 seconds | 3.0 | 4.0 | 4.5 | 4.0 | 0.2 | 1.5 | Heat block curing |
| Cured at 350° C. for 20 seconds | 4.0 | 4.5 | 4.7 | 4.5 | 0.4 | 2.0 | |
| Cured at 180° C. for one hour | Over 5.0 | Over 5.0 | Over 5.0 | Over 5.0 | 3.5 | 4.5 | Oven curing |
| Hydrolytic $Cl^{-1}$ concentration (ppm)*2 | 0.5 | 0.4 | 0.4 | 0.4 | 1.0 | 0.5 | |

*1: 2-mm$^2$ Si chips were bonded to a silver-plated copper frame at different temperatures and for different periods, and their adhesive strength at room temperature (23° C.) was determined by using a push-pull gauge.
*2: 10 g of powder of each conductive adhesive, which has been heat cured at 180° C. for one hour and pulverized to 100 meshes, was put into 50 ml of deionized water and extracted at 120° C. for 20 hours, and the $Cl^{-1}$ concentration in the extract was measured.

As seen from FIG. 1, the adhesives of Examples 1 and 3 are lower in exothermic heat peak temperature by about 10° C. than the adhesive of Comparative Example 2. Also, as shown in Table 1, the adhesives of the Examples of this invention are low in hydrolytic $Cl^{-1}$ concentration and capable of providing satisfactory adhesive strength after 20-second curing on a heat block.

According to the present invention, there can be obtained an adhesive which is fast-setting and has excellent hydrolytic resistance, and it becomes possible to produce the semiconductor devices with high reliability of moistureproofness while attaining an improvement of productivity and a cost reduction by shortening of adhesive curing time.

What is claimed is:

1. An electroconductive adhesive comprising:
   (a) an epoxy-novolak resin,
   (b) a phenol-aralkyl resin,
   (c) a glycidyl group-containing silane-based coupling agent,
   (d) at least one organic tetraphenyl borate, and
   (e) an electroductive metal powder; the component (b) being contained in an amount to make the number of phenolic OH groups per one epoxy group of the component (a) in the range of 0.6 to 1.5, the component (c) being contained in an amount of 30 to 500% by weight based upon the weight of component (a), the component (d) being contained in an amount of 1 to 20% by weight based on the weight of component (b), and the component (e) being contained in an amount of 65 to 85% by weight based on the total weight of the components (a), (b), (d) and (e).

2. An electroconductive adhesive according to claim 1, wherein the electroconductive metal powder is a silver powder.

3. An electroconductive adhesive according to claim 1, wherein the electroconductive metal powder is at least one member selected from the group consisting of metal powders of silver, gold, copper, nickel, iron, and stainless steel.

4. An electroconductive adhesive according to claim 1, wherein the at least one organic tetraphenyl borate is selected from a group consisting of tetraphenylphosphoniumtetraphenyl borate, 2-ethyl-4-methylimidazole-tetraphenyl borate or tetraphenyl borate of 1,8-diazabicyclo(5,4,0)undecene-7.

5. A semiconductor device in which semiconductor elements are bonded to a lead frame with the electroconductive adhesive set forth in claim 1.

* * * * *